United States Patent
Schaedler

(10) Patent No.: US 9,930,829 B2
(45) Date of Patent: Apr. 3, 2018

(54) SELF-CLEANING MOWER BLADE ASSEMBLY

(71) Applicant: MTD PRODUCTS INC, Valley City, OH (US)

(72) Inventor: Axel Schaedler, Olmsted Township, OH (US)

(73) Assignee: MTD PRODUCTS INC, Valley City, OH (US)

( * ) Notice: Subject to any disclaimer, the term of this patent is extended or adjusted under 35 U.S.C. 154(b) by 5 days.

(21) Appl. No.: 15/166,378

(22) Filed: May 27, 2016

(65) Prior Publication Data

US 2016/0345490 A1  Dec. 1, 2016

Related U.S. Application Data

(60) Provisional application No. 62/167,043, filed on May 27, 2015.

(51) Int. Cl.
| | |
|---|---|
| *A01D 34/73* | (2006.01) |
| *A01D 34/00* | (2006.01) |
| *A01D 34/82* | (2006.01) |
| *A01D 34/66* | (2006.01) |
| *A01D 101/00* | (2006.01) |

(52) U.S. Cl.
CPC ......... *A01D 34/003* (2013.01); *A01D 34/665* (2013.01); *A01D 34/73* (2013.01); *A01D 34/826* (2013.01); *A01D 2101/00* (2013.01)

(58) Field of Classification Search
CPC ... A01D 34/826; A01D 34/003; A01D 34/665
USPC ............ 56/17.5, 255, 295, DIG. 19, DIG. 20
See application file for complete search history.

(56) References Cited

U.S. PATENT DOCUMENTS

| | | | | |
|---|---|---|---|---|
| 2,471,367 A | * | 5/1949 | Cavaness | A01D 34/63 172/103 |
| 2,529,870 A | * | 11/1950 | Golasky | A01D 34/736 56/17.2 |
| 2,728,182 A | * | 12/1955 | Fulton | A01D 34/822 191/12.2 R |
| 2,867,963 A | * | 1/1959 | Lawrence | A01D 34/64 56/295 |
| 2,876,609 A | | 3/1959 | Swanson | |
| 2,888,796 A | | 6/1959 | Denney | |

(Continued)

FOREIGN PATENT DOCUMENTS

| | | |
|---|---|---|
| CN | 101541578 A | 9/2009 |
| EP | 2648307 A1 | 10/2013 |

(Continued)

OTHER PUBLICATIONS

International Search Report and Written Opinion dated Aug. 8, 2016 for PCT/US2016/036055 filed Jun. 6, 2016.

*Primary Examiner* — Thomas B Will
*Assistant Examiner* — Mai T Nguyen
(74) *Attorney, Agent, or Firm* — Wegman, Hessler & Vanderburg

(57) ABSTRACT

A self-cleaning, energy efficient blade assembly for use on lawn maintenance equipment and devices is provided. The blade assembly includes a shell and plurality of blades releasably attachable to the shell, wherein the shell is generally bowl-shaped. The blade assembly may also include a stabilizer ring that is positioned immediately adjacent to the shell for added structural rigidity and strength.

11 Claims, 4 Drawing Sheets

(56) References Cited

U.S. PATENT DOCUMENTS

| | | |
|---|---|---|
| 2,902,814 A * | 9/1959 | Lewis .................... A01D 34/63 56/13.4 |
| 2,957,295 A | 10/1960 | Brown |
| 3,002,331 A | 10/1961 | Denney |
| 3,008,283 A | 11/1961 | Wood |
| 3,029,582 A | 4/1962 | de Halleux |
| 3,049,854 A | 8/1962 | Denney |
| 3,085,386 A | 4/1963 | Slemmons |
| 3,091,906 A | 6/1963 | Hall |
| 3,097,467 A | 7/1963 | Konrad |
| 3,103,094 A * | 9/1963 | Cook .................... A01D 34/73 56/295 |
| 3,129,549 A | 4/1964 | Stauffer |
| 3,473,306 A | 10/1969 | Ewasko |
| 3,508,385 A | 4/1970 | Carlson |
| 3,563,014 A | 2/1971 | Krewson |
| 4,069,651 A | 1/1978 | Steffen |
| 4,171,608 A | 10/1979 | Hetrick |
| 4,189,903 A | 2/1980 | Jackson et al. |
| 4,205,510 A | 6/1980 | Raniero |
| 4,205,512 A | 6/1980 | Thorud |
| 4,313,297 A | 2/1982 | Maier |
| 4,407,112 A | 10/1983 | Shepherd et al. |
| 4,450,673 A | 5/1984 | Hutchison |
| 4,633,658 A | 1/1987 | Nogawa |
| 4,711,077 A | 12/1987 | Kutsukake et al. |
| 4,756,147 A | 7/1988 | Savell |
| 5,129,217 A | 7/1992 | Loehr |
| 5,184,451 A | 2/1993 | Savipakka et al. |
| 5,204,814 A | 4/1993 | Noonan et al. |
| 5,210,988 A | 5/1993 | Shaifer |
| D340,462 S | 10/1993 | Cowart |
| 5,267,429 A | 12/1993 | Kettler et al. |
| 5,299,414 A | 4/1994 | Long |
| 5,343,681 A * | 9/1994 | de Jong ............... A01D 34/736 56/255 |
| 5,483,790 A | 1/1996 | Kuhn et al. |
| 5,609,011 A | 3/1997 | Kuhn et al. |
| 5,782,073 A | 7/1998 | Sheldon |
| 5,809,765 A * | 9/1998 | Hastings .............. A01D 34/005 56/255 |
| 5,884,463 A | 3/1999 | Darzinskis |
| 5,960,617 A | 10/1999 | Sheldon |
| 5,987,863 A | 11/1999 | Busboom et al. |
| 6,052,979 A | 4/2000 | Tutschka |
| 6,065,276 A | 5/2000 | Hohnl et al. |
| 6,185,920 B1 | 2/2001 | Oxley |
| 6,286,293 B1 | 9/2001 | Scag et al. |
| 6,321,515 B1 | 11/2001 | Colens |
| 6,327,741 B1 | 12/2001 | Schaap |
| 6,339,735 B1 | 1/2002 | Peless et al. |
| 6,446,346 B1 * | 9/2002 | Castleman ........... A01D 34/416 30/276 |
| 6,493,613 B2 | 12/2002 | Peless et al. |
| 6,539,694 B2 | 4/2003 | Oxley |
| 6,571,544 B1 | 6/2003 | Buss et al. |
| 6,604,348 B2 | 8/2003 | Hunt |
| 6,779,328 B2 | 8/2004 | Buss et al. |
| 6,782,684 B2 | 8/2004 | Buss et al. |
| 6,892,519 B2 | 5/2005 | Sugden |
| 6,978,590 B1 | 12/2005 | Graham |
| 6,996,962 B1 | 2/2006 | Sugden et al. |
| 7,062,898 B2 | 6/2006 | Sarver et al. |
| 7,065,946 B2 | 6/2006 | Boeck et al. |
| 7,079,923 B2 | 7/2006 | Abramson et al. |
| 7,299,613 B2 | 11/2007 | Samejima et al. |
| D562,357 S * | 2/2008 | Hardy ............... D15/29 |
| 7,444,206 B2 | 10/2008 | Abramson et al. |
| 7,458,199 B2 | 12/2008 | Sarver et al. |
| 7,594,377 B1 | 9/2009 | Jansen et al. |
| 7,613,543 B2 | 11/2009 | Petersson et al. |
| 7,617,665 B2 | 11/2009 | Yamashita et al. |
| 7,668,631 B2 | 2/2010 | Bernini |
| 7,685,799 B2 | 3/2010 | Samejima et al. |
| 7,703,268 B2 | 4/2010 | Yanke |
| 7,729,801 B2 | 6/2010 | Abramson |
| 7,769,490 B2 | 8/2010 | Abramson et al. |
| 7,784,255 B2 | 8/2010 | Moore et al. |
| 7,988,380 B2 | 8/2011 | Harkcom et al. |
| 8,046,103 B2 | 10/2011 | Abramson et al. |
| 8,136,333 B1 | 3/2012 | Levin et al. |
| 8,171,709 B1 | 5/2012 | Bedford et al. |
| 8,239,992 B2 | 8/2012 | Schnittman et al. |
| 8,428,776 B2 | 4/2013 | Letsky |
| 8,452,450 B2 | 5/2013 | Dooley et al. |
| 8,532,822 B2 | 9/2013 | Abramson et al. |
| 8,600,582 B2 | 12/2013 | Bernini |
| 8,676,378 B2 | 3/2014 | Tian et al. |
| 8,818,602 B2 | 8/2014 | Yamamura et al. |
| 8,868,237 B2 | 10/2014 | Sandin et al. |
| 8,983,693 B2 | 3/2015 | Yamamura et al. |
| 2002/0066263 A1 * | 6/2002 | Megli ................. A01D 34/736 56/295 |
| 2004/0031255 A1 | 2/2004 | Kenny |
| 2004/0163373 A1 | 8/2004 | Adams et al. |
| 2004/0237492 A1 | 12/2004 | Samejima et al. |
| 2005/0126152 A1 | 6/2005 | Boeck et al. |
| 2005/0279072 A1 | 12/2005 | Sarver et al. |
| 2006/0150361 A1 | 7/2006 | Aldred et al. |
| 2006/0179809 A1 | 8/2006 | Sarver et al. |
| 2007/0062170 A1 | 3/2007 | Finkner |
| 2007/0193240 A1 | 8/2007 | Nafziger |
| 2007/0234699 A1 | 10/2007 | Berkeley |
| 2007/0273152 A1 | 11/2007 | Kawakami et al. |
| 2007/0289282 A1 | 12/2007 | Yamashita et al. |
| 2008/0072555 A1 | 3/2008 | Samejima et al. |
| 2008/0168756 A1 | 7/2008 | Nafziger |
| 2009/0087257 A1 | 4/2009 | Harkcom et al. |
| 2009/0126330 A1 | 5/2009 | Moore et al. |
| 2009/0266042 A1 | 10/2009 | Mooney et al. |
| 2011/0234153 A1 | 9/2011 | Abramson |
| 2013/0211646 A1 | 8/2013 | Yamamura et al. |
| 2013/0211647 A1 | 8/2013 | Yamamura et al. |
| 2013/0317680 A1 | 11/2013 | Yamamura et al. |
| 2014/0031979 A1 | 1/2014 | Borinato et al. |
| 2014/0058611 A1 | 2/2014 | Borinato |
| 2014/0324269 A1 | 10/2014 | Abramson et al. |
| 2015/0047310 A1 | 2/2015 | Schreiner |
| 2015/0128548 A1 | 5/2015 | Andre et al. |
| 2016/0081269 A1 | 3/2016 | Gottinger et al. |
| 2016/0278289 A1 | 9/2016 | Kasai |

FOREIGN PATENT DOCUMENTS

| | | |
|---|---|---|
| EP | 2656718 A1 | 10/2013 |
| EP | 2852029 A1 | 3/2015 |
| FR | 2 282 780 A1 | 3/1976 |
| FR | 2644971 | 10/1990 |
| GB | 2307163 | 5/1997 |
| WO | WO 88/04135 A1 | 6/1988 |
| WO | 2002/051241 A1 | 7/2002 |
| WO | 2014127212 A1 | 8/2014 |

* cited by examiner

SELF-CLEANING MOWER BLADE ASSEMBLY

CROSS-REFERENCE TO RELATED APPLICATIONS

This application claims priority to U.S. Provisional Patent Application Ser. No. 62/167,043, filed May 27, 2015, and titled SELF-CLEANING MOWER BLADE ASSEMBLY, which is herein incorporated by reference in its entirety.

FIELD OF THE INVENTION

The present invention is directed to outdoor power equipment, and more particularly, to lawn maintenance equipment using a rotary cutting blade.

BACKGROUND OF THE INVENTION

Lawn maintenance tools such as walk-behind lawn mowers, stand-on lawn mowers, riding lawn mowers, garden tractors, and the like often use a rotatable blade for cutting grass, and some of these blades also are configured to mulch the cut grass and other lawn refuse. These lawn mowers and lawn maintenance tools that often powered by gasoline- or fuel-powered engines are often very loud when in use by an operator. The noise generated by the engines is typically a result of the power needed to rotate the blade, in combination with the noise of the rotation of the blade within a cutting deck. The power and energy needed to rotate these blades at a sufficient rotational velocity can be substantial, particularly when used to mow wet lawns or when the grass is above a certain height.

BRIEF SUMMARY OF THE INVENTION

In one aspect of the present invention, a mower blade assembly is provided. The mower blade assembly includes a curved shell and a plurality of blades releasably attachable to said shell.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
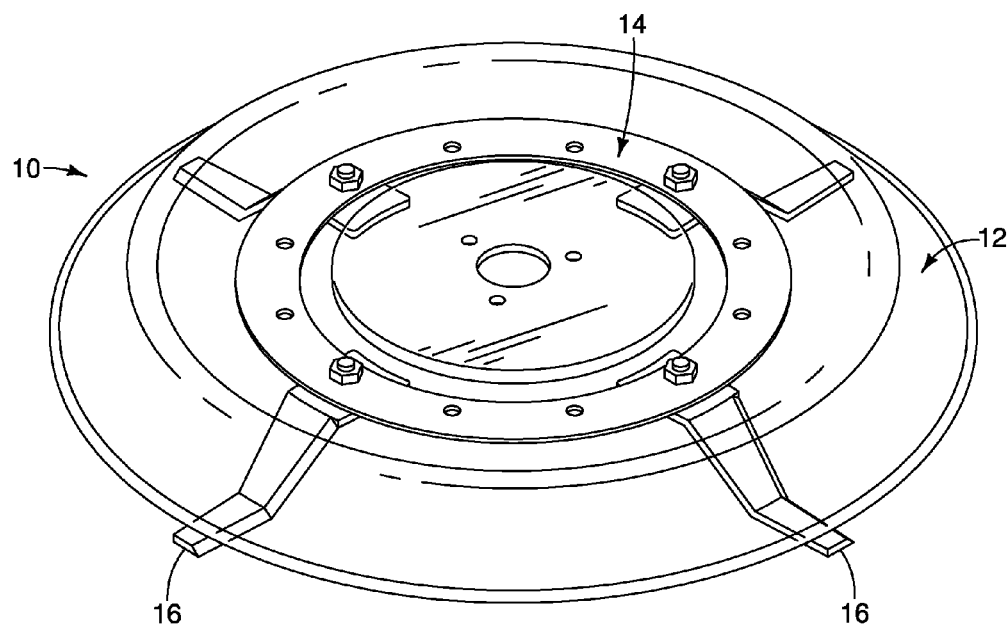
FIG. 1 is a perspective view of an embodiment of a blade assembly.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Referring to FIG. 1, an exemplary embodiment of a mower blade assembly 10 is shown. The mower blade assembly 10 includes a shell 12, a stabilizing ring 14 abutting the shell 12, and a plurality of blades 16 operatively connected to both the shell 12 and the stabilizing ring 14. In an embodiment, the shell 12 is formed of a plastic material, but it should be understood by one having ordinary skill in the art that any other material having sufficient structural rigidity and able to withstand the wear-and-tear due to the operation thereof is acceptable. The shell 12 is illustrated as being formed of a transparent material for ease of viewing, but it should be understood by one having ordinary skill in the art that the shell 12 may also be opaque or semi-transparent.

Figure 2:
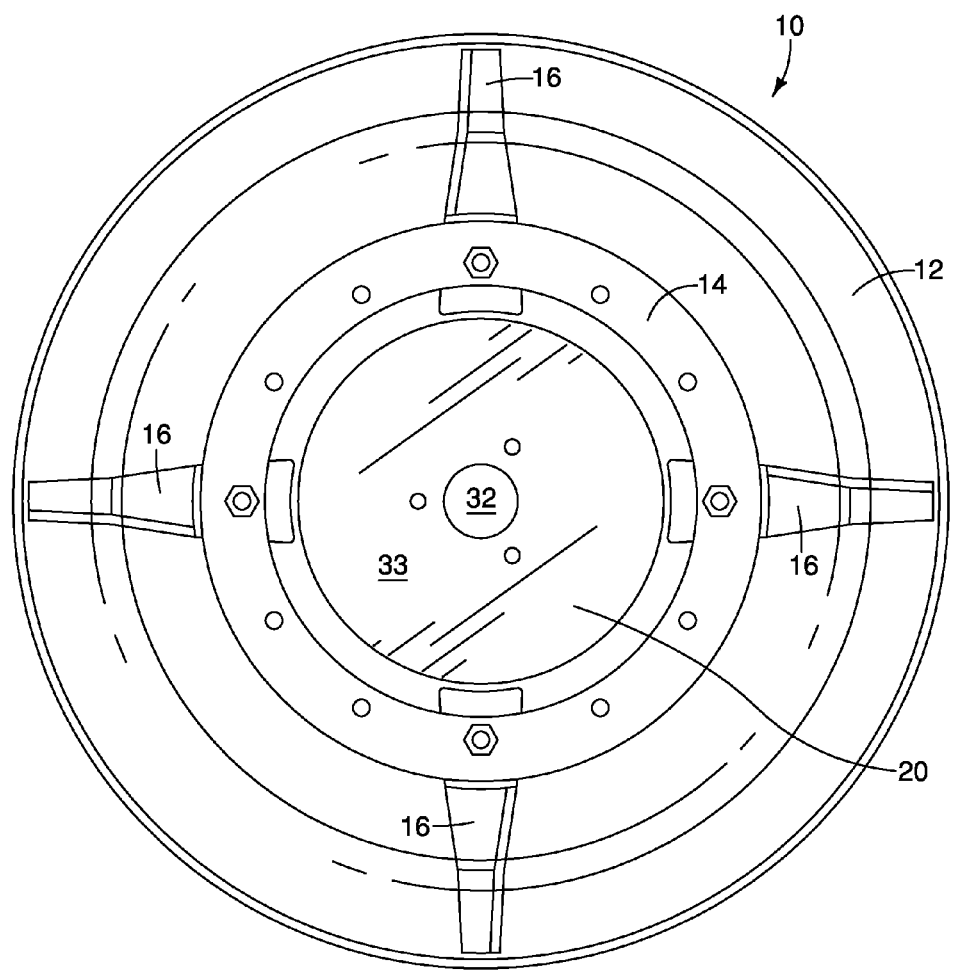
FIG. 2 is a top view of the blade assembly shown in FIG. 1.

In an embodiment, the shell 12 is bowl-shaped, wherein the opening of the bowl shape is directed downwardly, as shown in FIGS. 2A-2B. The shell 12 includes a substantially circular disc portion 20, a receiving portion 24 operatively connected to the disc portion 20 by way of an edge portion 22, a curved portion 26 extending from the receiving portion 24, and the outer peripheral edge of the curved portion 26 defining a lip 30. The disc portion 20 is a substantially flat and generally circular portion that is centrally located and provides a base for the shell 12. In other embodiments, the disc portion 20 is a non-flat or non-planar member having a generally circular shape. This can be particularly useful to provide a thicker area surrounding an attachment aperture 32 to provide additional structural rigidity or strength. The disc portion 20 includes at least one attachment aperture 32 formed through the thickness thereof. The attachment aperture 32 is configured to allow the mower blade assembly 10 to be attachable to a rotatable spindle (not shown) of a lawn maintenance tool, which allows rotation of the spindle to be transferred to the mower blade assembly 10. In the illustrated embodiment, the attachment aperture 32 is shown as a substantially circular aperture, but it should be understood by one having ordinary skill in the art that the attachment aperture 32 may be formed of any shape that allows for attachment of the mower blade assembly 10 a rotatable spindle. The edge portion 22 extends from the outer periphery of the disc portion 20 and provides a transition between the disc portion 20 and the receiving portion 24.

The edge portion 22 is integrally connected to, and extends from, the disc portion 20, as shown in FIGS. 1-4. The edge portion 22 extends in a substantially perpendicular orientation relative to the upper surface 33 of the disc portion 20. The edge portion 22 allows the receiving portion 24 to be offset relative to said upper surface 33 of the disc portion 20. The receiving portion 24 extends radially outward from the edge portion 22 in a substantially perpendicular manner. In other embodiments, the disc portion 20 is integrally connected with the receiving portion 24 to form a continuous surface having no edge portion transition therebetween. The disc portion 20 and receiving portion 24 are configured to provide an attachment between the blade assembly 10 and a lawn maintenance tool as well as provide a downwardly-curved shape in which the receiving portion 24 is positioned lower than the disc portion 20 such that the portion of the shell 12 to which the cutting blades 16 are attached is positioned below the level at which the blade assembly 10 is attached to the lawn maintenance tool (not shown).

The receiving portion 24 is a generally annular-shaped portion of the shell 12, as shown in FIGS. 1-4. The receiving portion 24 surrounds the disc portion 20. The receiving portion 24 is a substantially flat portion that is oriented substantially parallel to the upper surface 33 of the disc portion 20. The receiving portion 24 includes a plurality of attachment mechanisms 34 that are configured as apertures formed through the thickness of the receiving portion 24. In the illustrated embodiment, the receiving portion 24 includes twelve (12) attachment mechanisms 34. In other embodiments, the receiving portion 24 may include two or more attachment mechanisms 34. The attachment mechanisms 34 are configured to allow a blade 16 to be operatively connected, or removably attachable, to the shell 12. The attachment mechanisms 34 are equally spaced-apart about the receiving portion 24, but may also be non-equally spaced if a particular pattern of attachment mechanisms 34 for a blade configuration is needed. In the illustrated embodiment, the thickness of the receiving portion 24 is substantially the same as the disc portion 20. The downwardly-directed curved portion 26 extends from the receiving portion 24 in a continuous manner.

Figure 4:
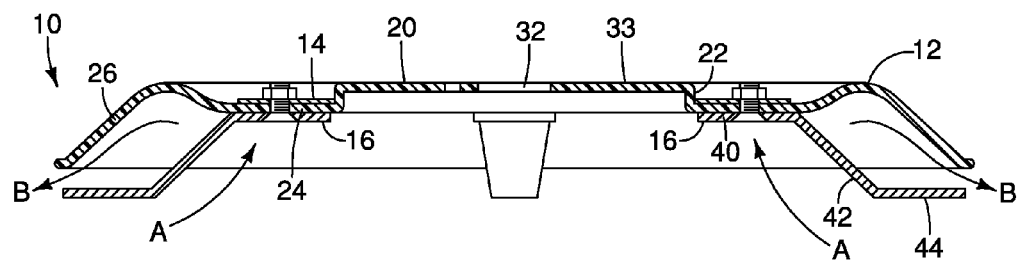
FIG. 4 is a cross-sectional view of the blade assembly shown in FIG. 1.

The curved portion 26 of the shell 12, as shown in FIGS. 1-4, is curved downwardly, thereby forming a generally cup-shaped shell 12 in which the lip 30 of the cup-shape is directed downwardly the blade assembly 10 is attached to a lawn maintenance vehicle. The curved portion 26 extends continuously from the receiving portion 14 and is curved upwardly and then downwardly, forming a general inverted U-shaped curve. The overall length of the upwardly-curved segment of the curved portion 26 is shorter than the length of the downwardly-curved segment. The upwardly-curved segment curves upwardly until it is substantially coplanar with the upper surface 33 of the disc portion, as shown in FIG. 4. The downwardly-curved segment extends vertically below the receiving portion 24, and the lip is located below the receiving portion 24. It should be understood by one having skill in the art that the radius of curvature of the curved portion 26 can vary between embodiments, and some embodiments may not include the upwardly-directed curved segment but instead angle downwardly from the receiving portion 24. The inner surface of the curved portion 26 provides a gently sloped surface against which cut grass typically contacts before being thrown radially outward from the blade assembly 10. The downwardly-curved segment of the curved portion 26 having a smaller inclination angle (relative to horizontal) assists in ensuring that the cut grass is thrown radially away from the lip 30 instead of being redirected back toward the blades 16 to be re-cut. The lip 30 forms the outer peripheral edge of the shell 12 and is located at the radial outward end of the curved portion 26.

In an embodiment, the blade assembly 10 includes a stabilizer ring 14 that is operatively connected to the shell 12, as shown in FIGS. 1-4. The stabilizer ring 14 is formed separately from the shell 12, and is placed into an abutting relationship with the receiving portion 24 of the shell 12 during assembly of the blade assembly 10. As will be discussed below, the blades 16 are removably attachable to the shell 12 and stabilizer ring 14, wherein the shell 12 and stabilizer ring 14 are in positioned in a sandwiching manner when the blades 16 are attached thereto. The stabilizer ring 14 is configured to increase the localized structural rigidity and strength of the shell 12. The stabilizer ring 14 can be attached to the shell 12 by glue, welding, or any other manner of fixedly attaching the stabilizer ring 14 to the shell 12. In other embodiments, the stabilizer ring 14 remains separate from the shell 12 and is removable therefrom when the blades 16 are detached.

Figure 3:
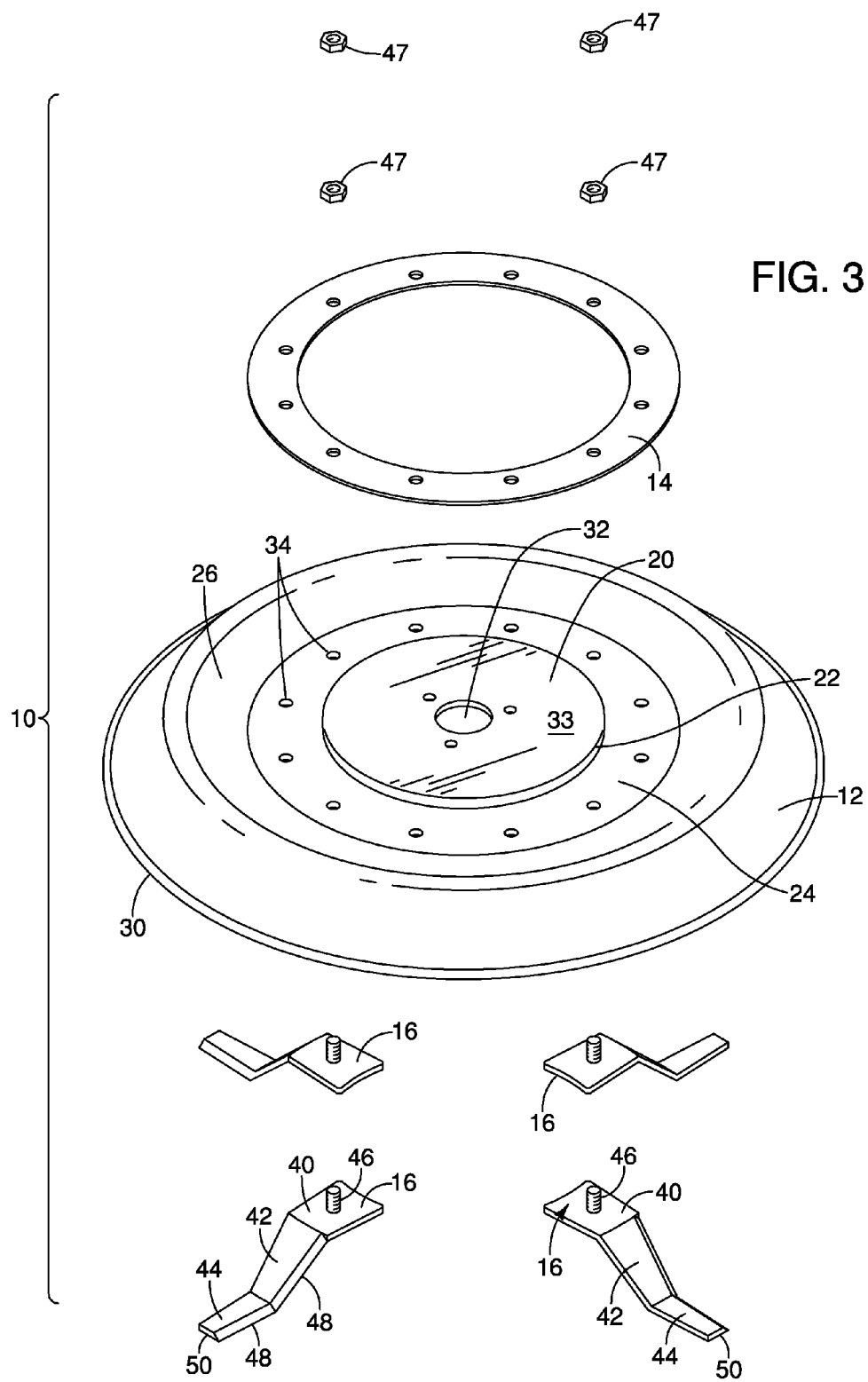
FIG. 3 is an exploded view of the blade assembly shown in FIG. 1.

As shown in FIG. 3, the illustrated embodiment of the stabilizer ring 14 is formed as a substantially flat, annular ring that is configured to be positioned about the disc portion 20 of the shell 12. The stabilizer ring 14 includes a plurality of attachment mechanisms 34 formed as apertures through the thickness of the stabilizer ring 14. Each attachment mechanism 34 is configured to receive a mechanical fastener that allows one of the blades 16 to be attached to one of the attachment mechanisms 34. The quantity of attachment mechanisms 34 of the stabilizer ring 14, and the pattern formed by the attachment mechanisms 34, should be the same as the attachment mechanisms 34 formed in the receiving portion 22 of the shell 12. The attachment mechanisms 34 of the stabilizer ring 14 are equally spaced-apart, but may also be non-equally spaced if a particular pattern of attachment mechanisms 34 for a blade configuration is needed. When the stabilizer ring 14 is positioned adjacent to the shell 12, the attachment mechanisms 34 of the shell 12 are aligned with the attachment mechanisms of the stabilizer ring 14.

In the exemplary embodiment illustrated in FIGS. 1-4, the blade assembly 10 includes a plurality of cutting blades 16. More particularly, the blade assembly 10 includes four (4) blades 16, but it should be understood by one having ordinary skill in the art that any number of blades 16—up to the quantity of attachment mechanisms 34—can be attachable to the shell 12 or the shell 12 and stabilizer ring 14. In other embodiments, the blade assembly 10 includes two or more blades 16. It should be understood by one having ordinary skill in the art that the blade assembly 10 may include more attachment mechanisms 34 than blades 16 attached thereto. The blades are releasably attachable to the shell 12 and stabilizer ring 14 to allow for quick and easy removal of the blades 16 for repair or replacement of the blades 16.

In an embodiment, each blade 16 is formed as a generally Z-shaped member having a first end portion 40, an angled portion 42 extending from the first end portion 40 at an angle thereto, and a second end portion 44 extending from the angled portion 42 and generally oriented parallel to the first end portion 40, as shown in FIG. 3. The first end portion 40 is generally flat and configured to abut the lower surface of the receiving portion 24 such that the abutting surfaces are substantially parallel. In the illustrated embodiment, a bolt 46 extends substantially perpendicular from the first end portion 40. The bolt 46 is configured to be receivable within the attachment mechanisms 34 of the shell 12 and the stabilizer ring 14. The bolt 46 includes a threaded portion that corresponds with a nut 47 that is attachable to the end of the bolt 46 inserted through the attachment mechanisms 34 during assembly of the blade assembly 10. In an embodiment, the bolt 46 is integrally formed with the first end portion 40 of the blade 16. In another embodiment, the bolt 46 is formed separately from the blade 16 and is inserted through an aperture in the first end portion 40.

The angled portion 42 of each blade 14 extends from the first end portion 40 at an angle relative thereto, as shown in FIGS. 3-4. The angled portion 42 is a substantially straight portion that extends between, and is integrally formed with, the first and second end portions 40, 44. In another embodiment, the angled portion 42 is non-linear, or is otherwise curved or includes a bend located between the first and second end portions 40, 44.

The second end portion 44 of the blade 16 is oriented substantially parallel to the first end portion 44 of the blade 16, as shown in FIG. 4. The second end portion 44 is a generally flat portion extending from the angled portion 42. In an embodiment, at least a portion of adjacent leading, or lateral edges 48 of the angled and first end portions 42, 44 of the blade 16 are sharpened into cutting surfaces. When the blade assembly 10 is assembled, the leading edges 48 of each blade 16 are oriented in the direction of rotation of the blade assembly 16. The blade 16 extends radially outwardly and downwardly toward the lip 30 from the lower surface of the receiving portion 24 of the shell 12 when attached to the shell 12 and stabilizer ring 14. In an embodiment, the tip 50 of each blade 16 is located radially inward from the outer radial edge of the lip 30 of the shell 12. In another embodiment, the tip 50 of each blade 16 extends radially outward as far as the lip 30 of the shell 12. In yet another embodiment, the tip 50 of each blade 16 extends radially beyond the lip 30.

FIG. 1 illustrates an assembled exemplary embodiment of a blade assembly 10. During assembly of the blade assembly 10, the stabilizer ring 14 is positioned immediately adjacent to the upwardly-directed surface of the receiving portion 24 of the shell 12 and rotated until the attachment mechanisms 34 of the receiving portion 24 are aligned with the corresponding attachment mechanisms 34 of the shell 12. Once the attachment mechanisms 34 are aligned, the bolt 46 of each blade 16 is inserted through the aligned attachment mechanisms 34 and a nut 47 is threadingly secured to each bolt 46. When the nut 47 is attached to a corresponding bolt, the shell 12 and the stabilizing ring 14 are sandwiched between the nut 47 and bolt 46.

In operation, the blade assembly 10 is attached to a spindle (not shown) of a lawn maintenance device and oriented such that the blade assembly 10 is generally horizontally aligned and the leading edges 48 of each blade are directed toward the direction rotation of rotation of the blade assembly 10. As the shell 12, stabilizer ring 14, and blades 16 of the blade assembly rotate simultaneously, the rotation of the shell 12 generates a boundary layer of air which causes the localized air to move radially outward along the inner surface of the curved portion 26 toward the lip 30. This radially-outward air flow along the curved portion 26 creates a localized high pressure area between the blades 16 and the curved portion 26 of the shell 12 as well as creates a low pressure area within the shell 12 and within the path of movement of the blades 16. The high pressure area between the blades 16 and the shell 12 causes the air flow, as illustrated by arrow B in FIG. 4, to exit between the tips 50 of the blades 16 and the lip 30 of the shell 12. The low pressure area within the shell causes air to flow in a direction from below the blade assembly 10 into the shell 12, as illustrated by arrow A in FIG. 4, which then flows outwardly along the curved surface 26 as explained above, creating a somewhat cyclical air flow pattern within the volume bounded by the shell 12.

As the blade assembly 10 rotates, the upward-moving air flow within the shell 12 lifts the blades of grass (not shown) while the sharpened leading edges 48 of the blades 16 cut the blades of grass that extend above the cutting surfaces. The tips of the cut blades of grass are light enough in weight to be carried upwardly by the air flow toward the inner surface of the shell 12 where the blades of grass contact the moving shell 12. As the cut grass travels upwardly, at least a portion of the cut grass contacts in the inner surface of the shell 12, wherein the contact with the shell causes the cut grass to be redirected such that the cut grass is thrown radially outward by the shell 12. The cut grass that is thrown radially outward by the shell 12 combines with the cut grass that simply moves radially outward in response to the air flow within the shell moving from the high pressure area toward the low pressure area outside of the shell 12. This radially outward movement of the cut blade tips helps to spread the cuttings into the surrounding grass without recirculating the cut blade tips within the shell 12. Also, because the cut blade tips are relatively light weight, some can be easily moved by the air flow generated by the rotation of the blade assembly 10 such that they do not accumulate along or contact the inner surface of the shell 12. Additionally, because the inner surface of the curved portion 26 is continuous and substantially smooth, the cut blade tips do not have a structure to adhere to without being pushed or moved by the air flow or by contact with the shell 12 through the high pressure area. As such, the blade assembly 10 is self-cleaning and does not require frequent or infrequent cleaning of accumulated cut grass blade tips. In addition, the blade assembly 10 can be formed of lightweight materials which require less energy to rotate, thereby decreasing the energy requirement of the lawn maintenance device compared to larger and bulkier metal cutting blades. The quantity and arrangement of the blades 16 provide an efficient and superior cut quality, and the quantity and arrangement of the blades 16 can be easily modified to optimize the cut quality of the blade assembly 10.

In other embodiments, the blade assembly does not include a stabilizer ring 14 but instead includes a shell 12 in which the thickness of the receiving portion 24 is increased to provide increased structural rigidity and strength.

It should be understood by one having ordinary skill in the art that although each portion of the exemplary embodiment of the shell 12 illustrated in FIGS. 1-4 includes the same thickness, the thickness of any portion of the shell 12 may be different than the other portions or even a localized area of any portion of the shell 12 may have a different thickness than the rest of the portion and/or the other portions.

Figure 6:
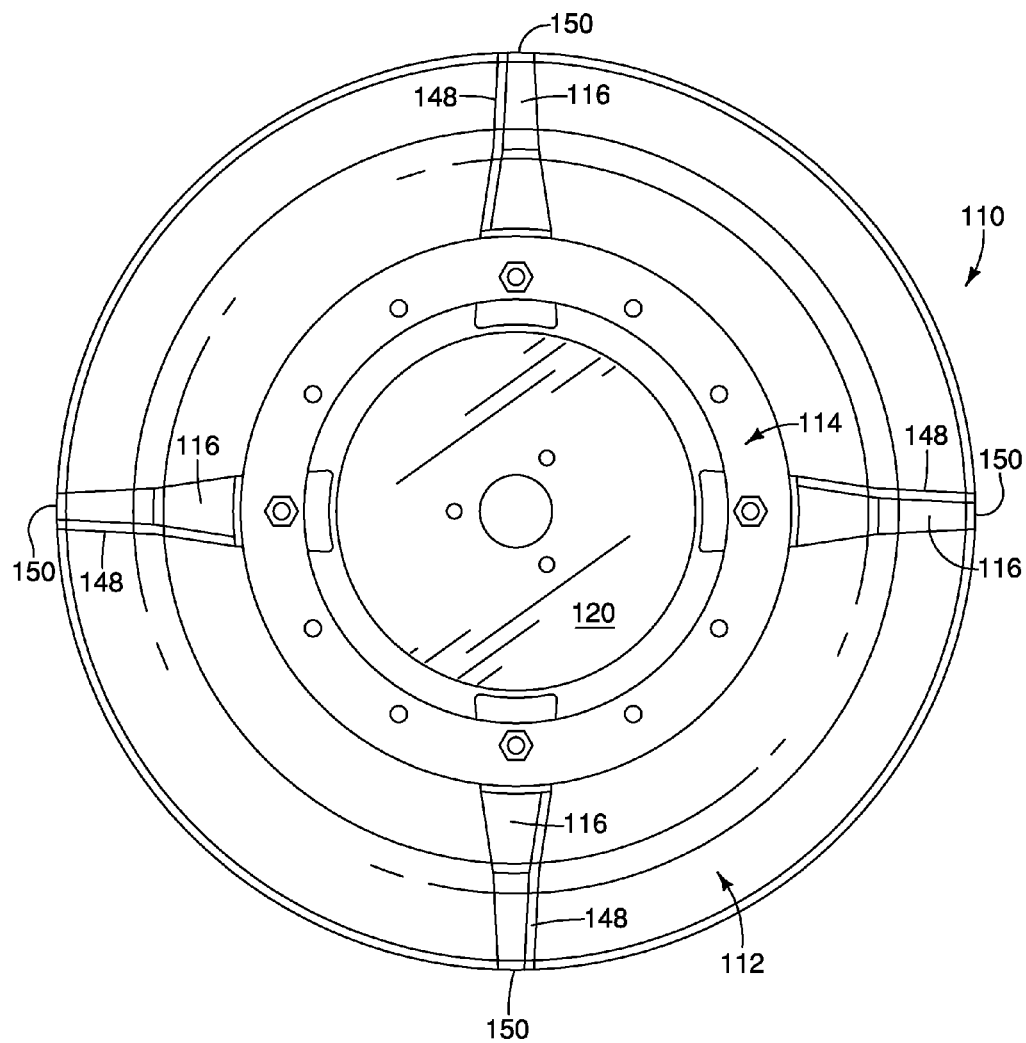
FIG. 6 is a top view of the blade assembly shown in FIG. 5.
Figure 5:
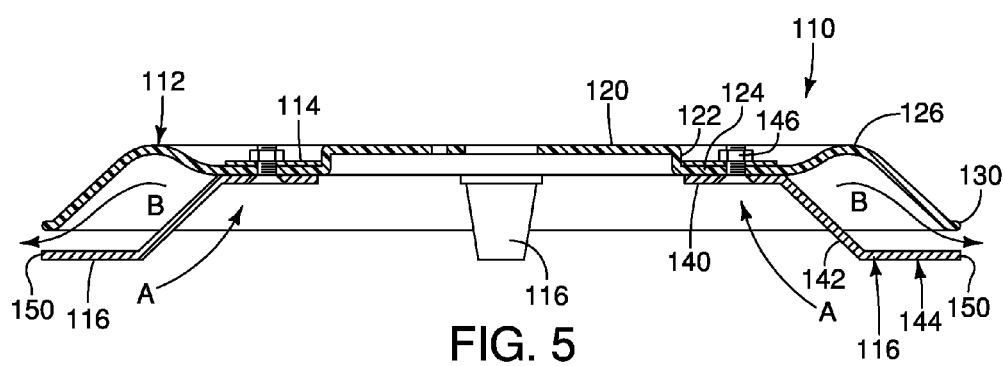
FIG. 5 is a cross-sectional view of another embodiment of a blade assembly.

In another embodiment of a mower blade assembly 110, as shown in FIGS. 5-6, the shell 112 includes a circular disc portion 120, an edge portion 122, a receiving portion 124, and a curved portion 126. The outer peripheral edge of the curved portion 126 defines a lip 130. The overall structure and arrangement of the shell 112 and stabilizer ring 114 are substantially similar to the embodiment shown in FIGS. 1-4.

In the exemplary embodiment illustrated in FIGS. 5-6, the blade assembly 110 includes a plurality of cutting blades 116. More particularly, the blade assembly 110 includes four (4) blades 116, but it should be understood by one having ordinary skill in the art that any number of blades 116 can be attachable to the shell 112 or the shell 12 and stabilizer ring 114. The blades 116 are releasably attachable to the shell 112 and stabilizer ring 114 to allow for quick and easy removal of the blades 116 for repair or replacement.

In an embodiment, each blade 116 is formed as a generally Z-shaped member having a first end portion 140, an angled portion 142 extending from the first end portion 140 at an angle thereto, and a second end portion 144 extending from the angled portion 142 and generally oriented parallel to the first end portion 140, as shown in FIG. 5. The first end portion 140 is generally flat and configured to abut the lower surface of the receiving portion 124 such that the abutting surfaces are substantially parallel. In the illustrated embodiment, a bolt 146 extends substantially perpendicular from the first end portion 140 to operatively connect the blade 116 to the shell 112 and stabilizer ring 114.

The angled portion 142 of each blade 114 extends from the first end portion 140 at an angle relative thereto, as shown in FIG. 5. The angled portion 142 is a substantially straight portion that extends between, and is integrally formed with, the first and second end portions 140, 144. In another embodiment, the angled portion 142 is non-linear, or is otherwise curved or includes a bend located between the first and second end portions 140, 144.

The second end portion 144 of the blade 116 is oriented substantially parallel to the first end portion 144 of the blade 116, as shown in FIG. 5. The second end portion 144 is a generally flat portion extending from the angled portion 142. In an embodiment, at least a portion of adjacent leading edges 148 of the angled and first end portions 142, 144 of the blade 116 are sharpened into cutting surfaces. When the blade assembly 110 is assembled, the leading edge 148 of each blade 116 is oriented in the direction of rotation of the blade assembly 116. The blade 116 extends radially outwardly and downwardly toward the lip 130 from the lower surface of the receiving portion 124 of the shell 112. In the illustrated embodiment of the blade assembly 110, the tip 150 of each blade 116 extends radially beyond the lip 130.

In the embodiment of the mower blade assembly 110 shown in FIGS. 5-6, the tip 150 of each blade 116 extends beyond the lip 130 of the shell 112 in order to cut the blades of grass that are immediately adjacent to the outer edge of the shell 112 while the blade assembly 110 is rotating. Arrow A in FIG. 5 shows the movement of air below the rotating blades 116 moving upwardly toward the center of the shell 112 while the movement of air above the blades 116 moves radially outward, as shown by arrow B. In some embodiments in which the tips 150 of the blades 116 is radially within the lip 130 of the shell 112, the radially outward movement of air (arrow B) caused by the rotation of the blade assembly 10 can push down those blades of grass that are located immediately outward from the lip 130 which may prevent those blades of grass from getting cut. However, when the tips 150 extend beyond the lip 130, the pathway of movement of the radially outward flow of air changes slightly but the blades 116 are able to ensure not only a wider swatch of cut grass but also ensures that the blades of grass that may not have been cut in the area immediately radially outward from the lip 130 of the shell 120 are cut.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A mower blade assembly comprising:
   a curved shell having a disc portion and a receiving portion, wherein said receiving portion extends from said disc portion and is positioned below the disc portion, said shell further including a curved portion extending from said receiving portion, said curved portion having an inverted U-shape;
   and a plurality of blades releasably attachable to said receiving portion of said shell
   wherein rotation of said shell generates a boundary layer of air between said blades and said curved portion of said shell, and said boundary layer of air creates a localized high pressure area which causes air to flow radially outward from said shell.

2. The mower blade assembly of claim 1, wherein said curved shell further includes an edge portion extending substantially perpendicular relative to said disc portion, said receiving portion extending from said edge portion in a generally parallel manner relative to said disc portion.

3. The mower blade assembly of claim 1, wherein said curved shell includes a plurality of spaced-apart attachment mechanisms at which said plurality of blades are attachable to said shell.

4. The mower blade assembly of claim 1, wherein said shell includes two or more attachment mechanisms, each of said plurality of blades being attachable to said shell at one of said attachment mechanisms.

5. The mower blade assembly of claim 1, wherein said plurality of blades are attachable to said shell in an equally spaced-apart manner.

6. A mower blade assembly comprising:
   a curved shell having a disc portion and a receiving portion, wherein said receiving portion extends from said disc portion and is positioned below the disc portion, said shell further including a curved portion extending from said receiving portion, said curved portion having an inverted U-shape;
   and a plurality of blades releasably attachable to said receiving portion of said shell;
   wherein said curved shell includes an outer radial lip, and each of said plurality of blades includes a blade tip that is spaced-apart from said lip and located radially within said lip.

7. A mower blade assembly comprising:
   a curved shell having a disc portion and a receiving portion, wherein said receiving portion extends from said disc portion and is positioned below the disc portion, said shell further including a curved portion extending from said receiving portion, said curved portion having an inverted U-shape;
   and a plurality of blades releasably attachable to said receiving portion of said shell;
   further comprising a stabilizer ring operatively connected to said shell, wherein said plurality of blades are attached to said shell and said stabilizer ring.

8. The mower blade assembly of claim 7, wherein said shell and said stabilizer ring include a plurality of alignable apertures to provide a plurality of equally spaced-apart attachment mechanisms to which each of said plurality of blades is attachable to said shell and said stabilizer ring.

9. The mower blade assembly of claim 1, wherein each of said plurality of blades is Z-shaped.

10. The mower blade assembly of claim 1, wherein each of said plurality of blades includes a first end portion attachable to said shell, an angled portion extending from said first end portion at an angle thereto, and a second end portion extending from said angled portion and generally oriented parallel to said first end portion.

11. The mower blade assembly of claim 10, wherein at least a portion of adjacent edges of said angled portion and said second end portion of each of said plurality of blades are sharpened to allow for cutting.

* * * * *